(12) United States Patent
Wang et al.

(10) Patent No.: US 6,832,838 B2
(45) Date of Patent: Dec. 21, 2004

(54) PROJECTOR HAVING RETRACTABLE HOUSINGS

(75) Inventors: Chih-Kuang Wang, Hsinchu (TW); Zen-Gwo Sun, Yang-Mei (JP)

(73) Assignee: Microtek International, Inc., Hsinchu (TW)

( * ) Notice: Subject to any disclaimer, the term of this patent is extended or adjusted under 35 U.S.C. 154(b) by 0 days.

(21) Appl. No.: 10/612,619

(22) Filed: Jul. 1, 2003

(65) Prior Publication Data

US 2004/0141155 A1 Jul. 22, 2004

(30) Foreign Application Priority Data

Jan. 8, 2003 (TW) ...................................... 92200428 U

(51) Int. Cl.⁷ .................. G03B 21/22; G03B 21/16; G03B 21/18
(52) U.S. Cl. ..................... 353/119; 353/61; 353/52
(58) Field of Search ............................... 353/57–61, 52, 353/119; 349/6–10; 348/744, 748, 787–789

(56) References Cited

U.S. PATENT DOCUMENTS

| 540,414 | A | * | 6/1895 | Wrench ....................... 353/101 |
| 5,692,821 | A | * | 12/1997 | Rodriguez, Jr. et al. ....... 353/52 |
| 5,779,343 | A | * | 7/1998 | Denley ......................... 362/507 |
| 5,820,242 | A | * | 10/1998 | Rodriguez et al. ........... 353/119 |
| 5,951,136 | A | * | 9/1999 | Furuhata et al. ............. 353/31 |
| 6,709,115 | B2 | * | 3/2004 | Chimura et al. ............ 353/119 |

* cited by examiner

*Primary Examiner*—Judy Nguyen
*Assistant Examiner*—Andrew Sever
(74) *Attorney, Agent, or Firm*—Pro-Techtor International Services

(57) ABSTRACT

A projector includes a casing, a light source, an optical engine, inlet ports and outlet ports formed on the casing, and a fan mounted in the casing. The fan sucks air streams from the inlet ports into the casing and forces the air streams to flow out of the casing via the outlet ports. A buffer chamber is defined among the fan, the outlet ports, and the casing. The casing includes a first housing and a second housing. The first housing is retractable relative to the second housing so that a volume of the buffer chamber may be changed.

5 Claims, 10 Drawing Sheets

PROJECTOR HAVING RETRACTABLE HOUSINGS

BACKGROUND OF THE INVENTION

1. Field of the Invention

The invention relates to a projector, and more particularly to a projector having retractable housings to reduce the noises.

2. Description of the Related Art

Recently, a projector has become an indispensable apparatus in the teaching or meeting occasions. More particularly, with the popularization of the notebook computers, the digital projector is more suitable for the above-mentioned occasions.

The projector needs a light source with high brightness so as to clearly project images onto a display screen. However, the light source with high brightness may cause a high-temperature condition in the projector. Therefore, the currently used projector needs a fan to dissipate heat generated from the light source, which is the main heat source in the projector, control the proper thermal flow field, and prevent high temperature environment from damaging the electronic elements and optical elements in the projector.

Recently, the volume of the projector is getting smaller and smaller. However, if the volume of the projector is reduced, the redundant space within the projector has to be removed. In this case, the hot air streams are directly exhausted at high speed to cause great noises because no more slowdown space for the air streams is left in the projector.

FIG. 1 is a schematic top view showing a conventional projector, and FIG. 2 is a side view showing the projector of FIG. 1. Referring to FIGS. 1 and 2, the projector includes a casing 110, a light source 128, an optical engine 130, fans 120 and 122, and a plurality of circuit boards 132. The casing 110 is formed with inlet ports 112 and 114, through which air streams 124 may flow into the casing 110, and outlet ports 116 and 118, through which the air streams 124 may flow out of the casing 110. The light source 128, which is the main heat source, emits light rays to the optical engine 130. Then, the optical engine 130 processes the light rays and projects an image onto a display screen. The fans 120 and 122 introduce the air streams 124 into the casing 110 through the inlet ports 112 and 114 and dissipate heat from the outlet ports 116 and 118.

A buffer chamber 126, which is defined among the fan 120, casing 110 and outlet ports 116, may be regarded as a slowdown space for the air streams 124 from the buffer chamber 126 to the casing 110. When a designer wants to reduce the volume of the projector, it is possible to consider that the buffer chamber 126 may be reduced so as not to influence the normal functions of the projector. However, reducing the buffer chamber 126 may reduce the slowdown space for the air streams 124 and cause the air streams 124 to flow out via the outlet ports 116 at high speed. In this case, relatively great noises may be generated.

SUMMARY OF THE INVENTION

An object of the invention is to provide a projector capable of reducing noises.

Another object of the invention is to provide a miniaturized projector that is portable and causes smaller noises.

To achieve the above-mentioned objects, the invention provides a projector including a casing, a light source, an optical engine, inlet ports and outlet ports formed on the casing, and a fan mounted in the casing. The fan sucks air streams from the inlet ports into the casing and forces the air streams to flow out of the casing via the outlet ports. A buffer chamber is defined among the fan, the outlet ports, and the casing. The casing includes a first housing and a second housing. The first housing is retractable relative to the second housing so that a volume of the buffer chamber may be changed.

The projector may further include a light source mounted to the casing and positioned between the inlet ports and the fan. In addition, the projector may further include a rack attached to the first housing, and a driving gear for driving the rack so as to move the first housing.

The inlet ports and the outlet ports may be formed on the second housing and the first housing, respectively. The first housing is retractable relative to the second housing along a direction perpendicular or parallel to a direction of the air streams or along an arbitrary direction.

DETAILED DESCRIPTION OF THE INVENTION

The preferred embodiments of the invention will be described with reference to the accompanying drawings.

Figure 1:
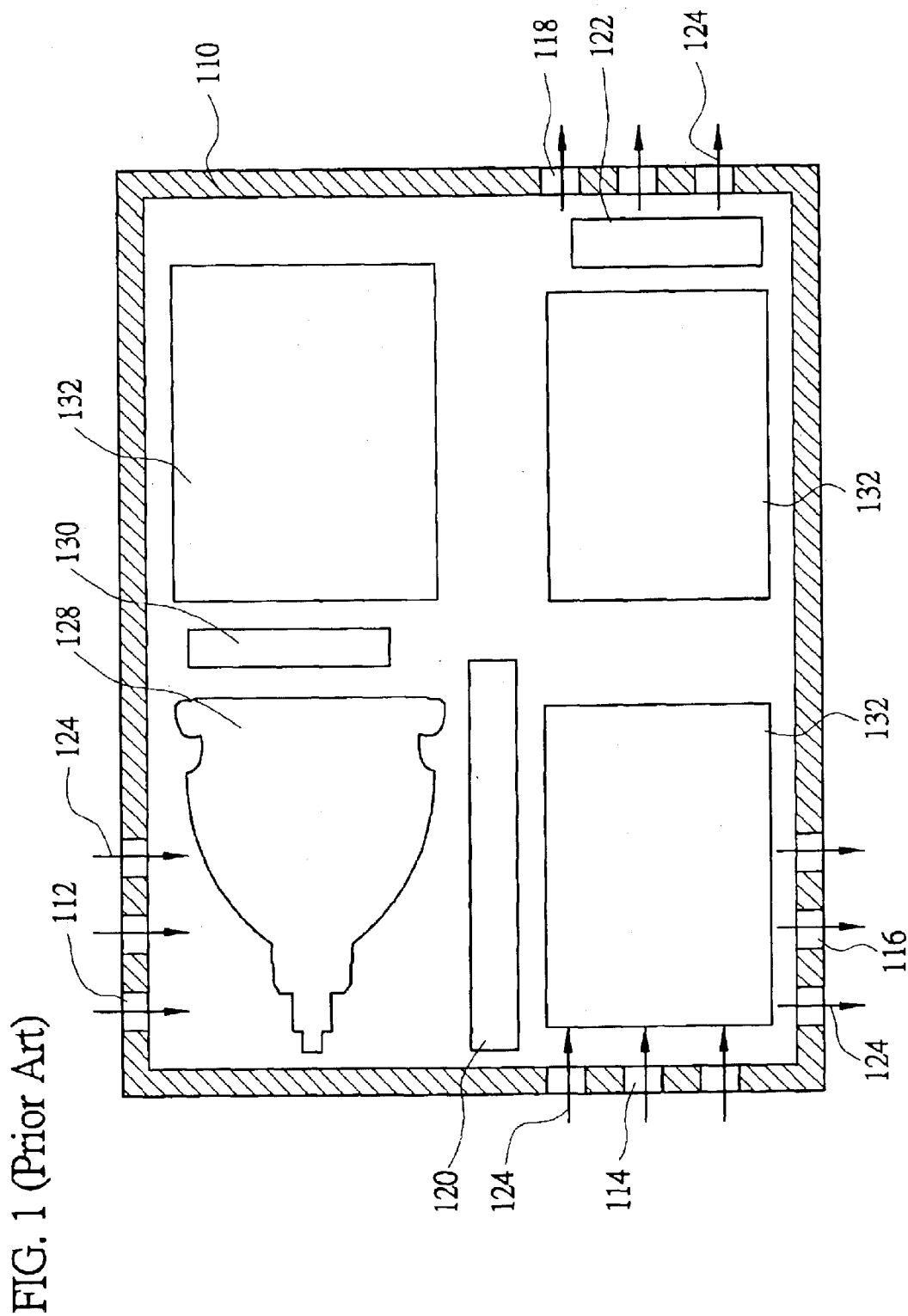
FIG. 1 is a schematic top view showing a conventional projector.
Figure 2:
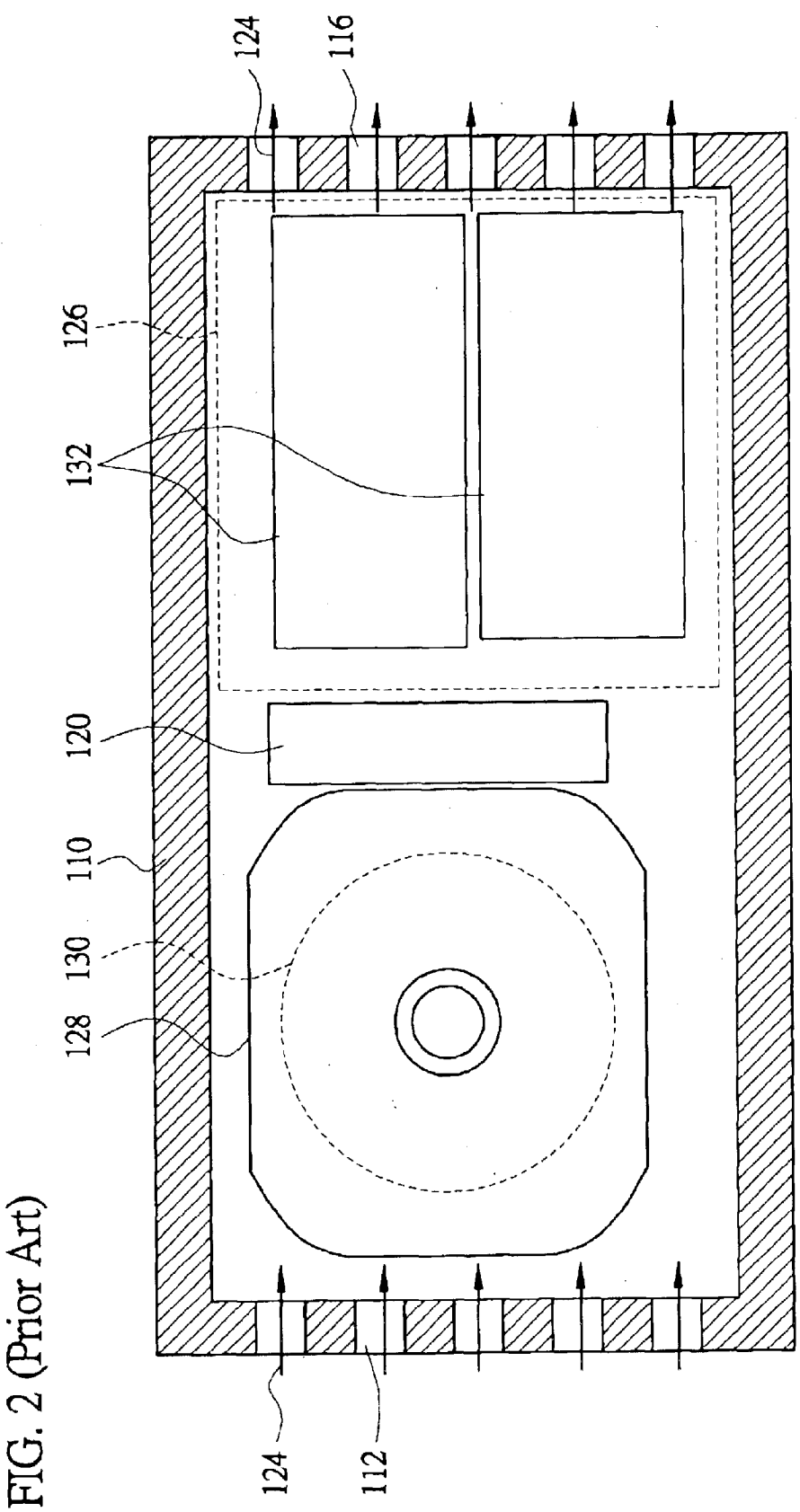
FIG. 2 is a side view showing the projector of FIG. 1.
Figure 3:
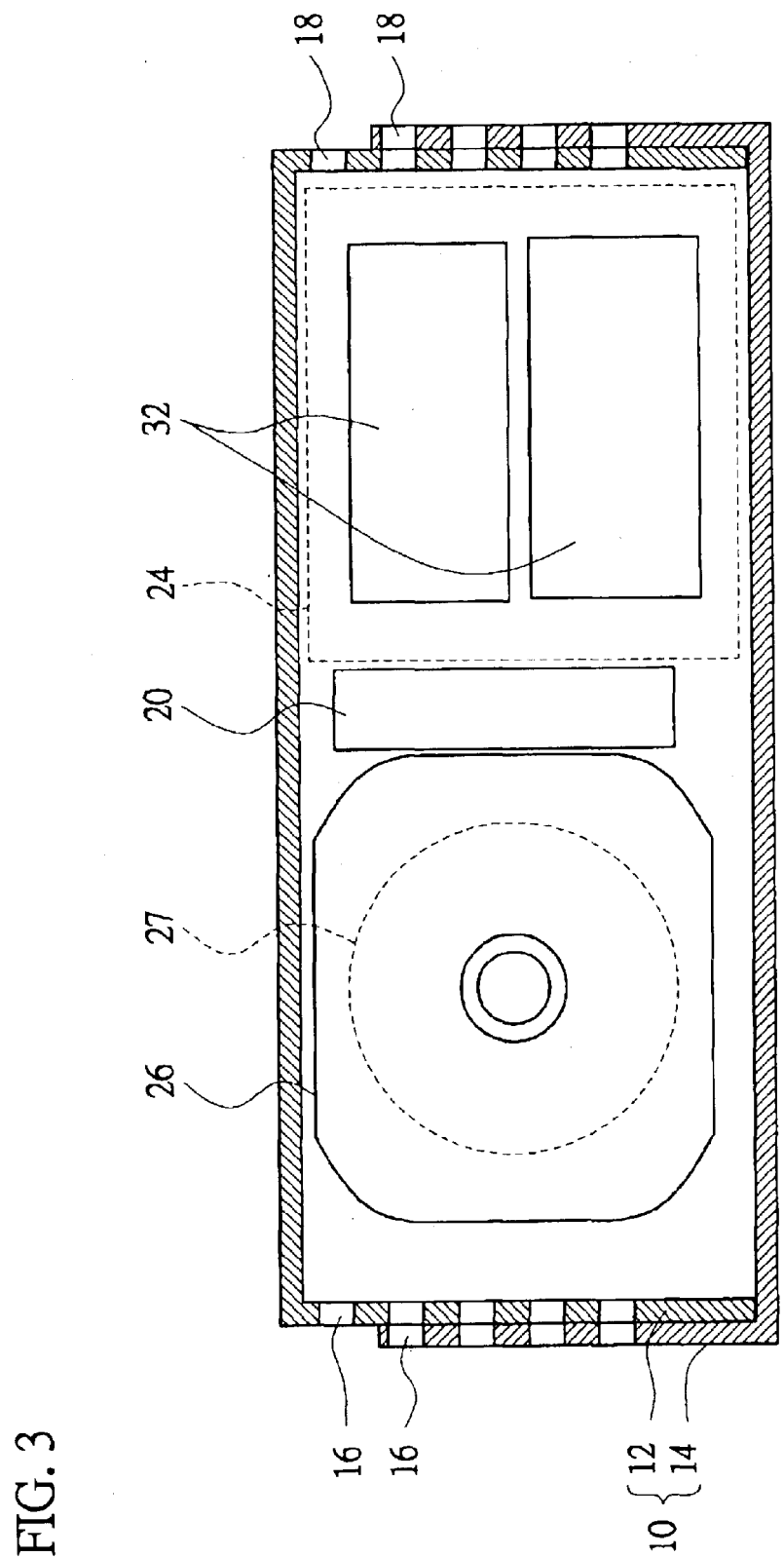
FIG. 3 is a schematic illustration showing a projector in a retracted state according to a first embodiment of the invention.
Figure 4:
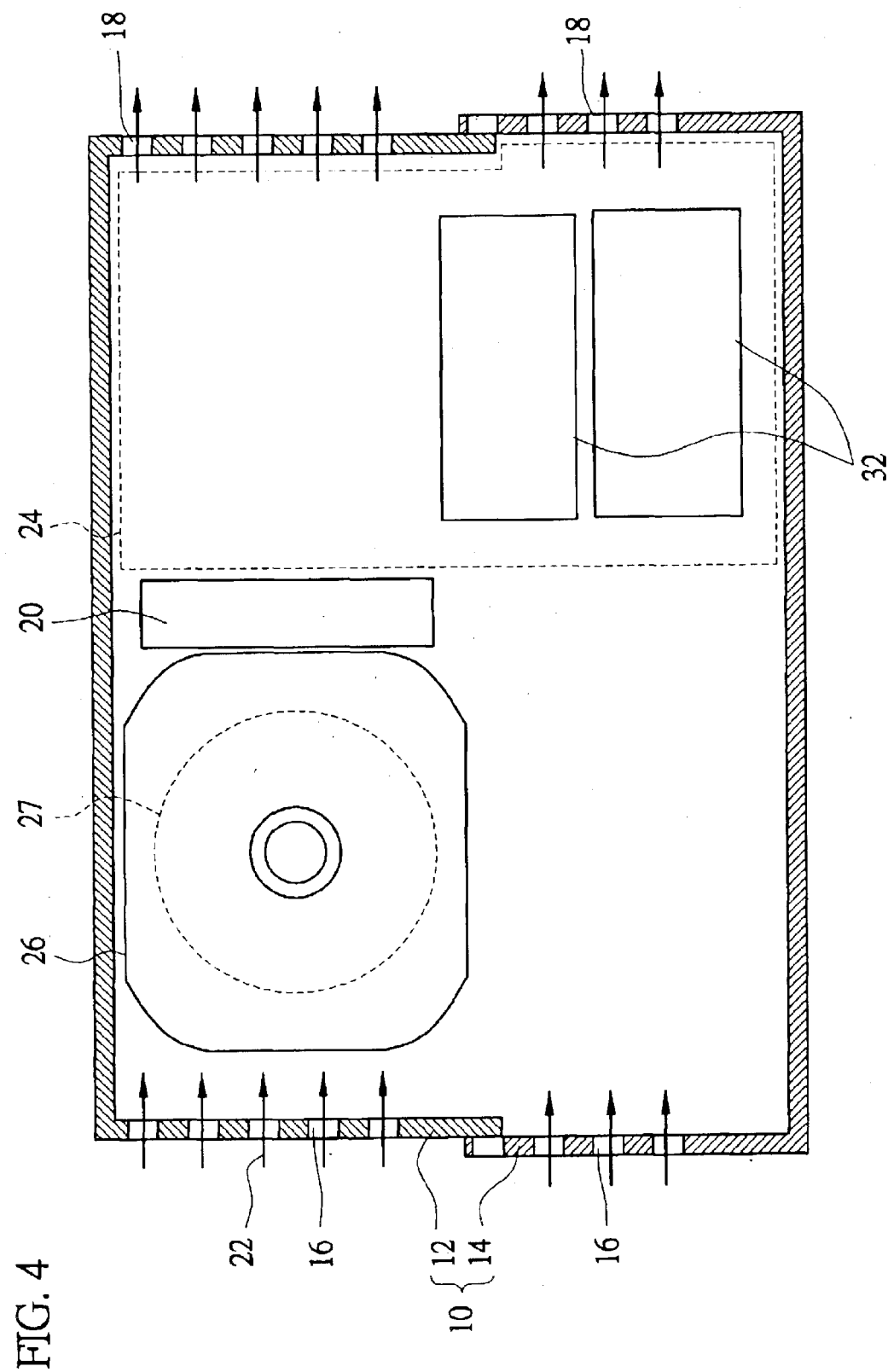
FIG. 4 is a schematic illustration showing the projector in an expanded state according to the first embodiment of the invention.

FIGS. 3 and 4 are schematic illustrations showing projectors in a retracted state and an expanded state according to a first embodiment of the invention, respectively. Referring to FIGS. 3 and 4, the projector according to the first embodiment of the invention includes a casing 10, inlet ports 16 and outlet ports 18 formed on the casing 10, a fan 20, a light source 26, an optical engine 27 and a plurality of circuit boards 32. The light source 26 is installed within the casing 10 and may be interposed between the inlet ports 16 and the fan 20. The optical engine 27 processes light rays from the light source 26 and projects an image onto a display screen.

A plurality of electronic elements (not shown) for the projector is installed on the circuit boards 32. The fan 20 is installed in the casing 10 to suck air streams 22 from the inlet ports 16 and take away the heat generated from the light source 26. A buffer chamber 24 is defined among the fan 20, the outlet ports 18 and the casing 10. The air streams 22 pass through the buffer chamber 24 and are slowed down and then exhausted from the outlet ports 18. It is to be noted that the casing 10 includes a first housing 12 and a second housing 14, wherein the first housing 12 is retractable relative to the second housing 14. The first housing 12 and the second housing 14 are formed with the inlet ports 16 and outlet ports 18.

When the projector is not used, as shown in FIG. 3, most of the first housing 12 is retracted into the second housing 14, and the projector has a minimum volume at this time. When the projector is used, as shown in FIG. 4, a portion of the first housing 12 is pulled out of the second housing 14 along a direction substantially perpendicular to the direction of the air streams 22. At this time, the volume of the buffer chamber 24 is enlarged so that the air streams 22 may be sufficiently slowed down in the buffer chamber 24 and then exhausted from the outlet ports 18. Thus, the noises may be advantageously reduced.

Figure 5:
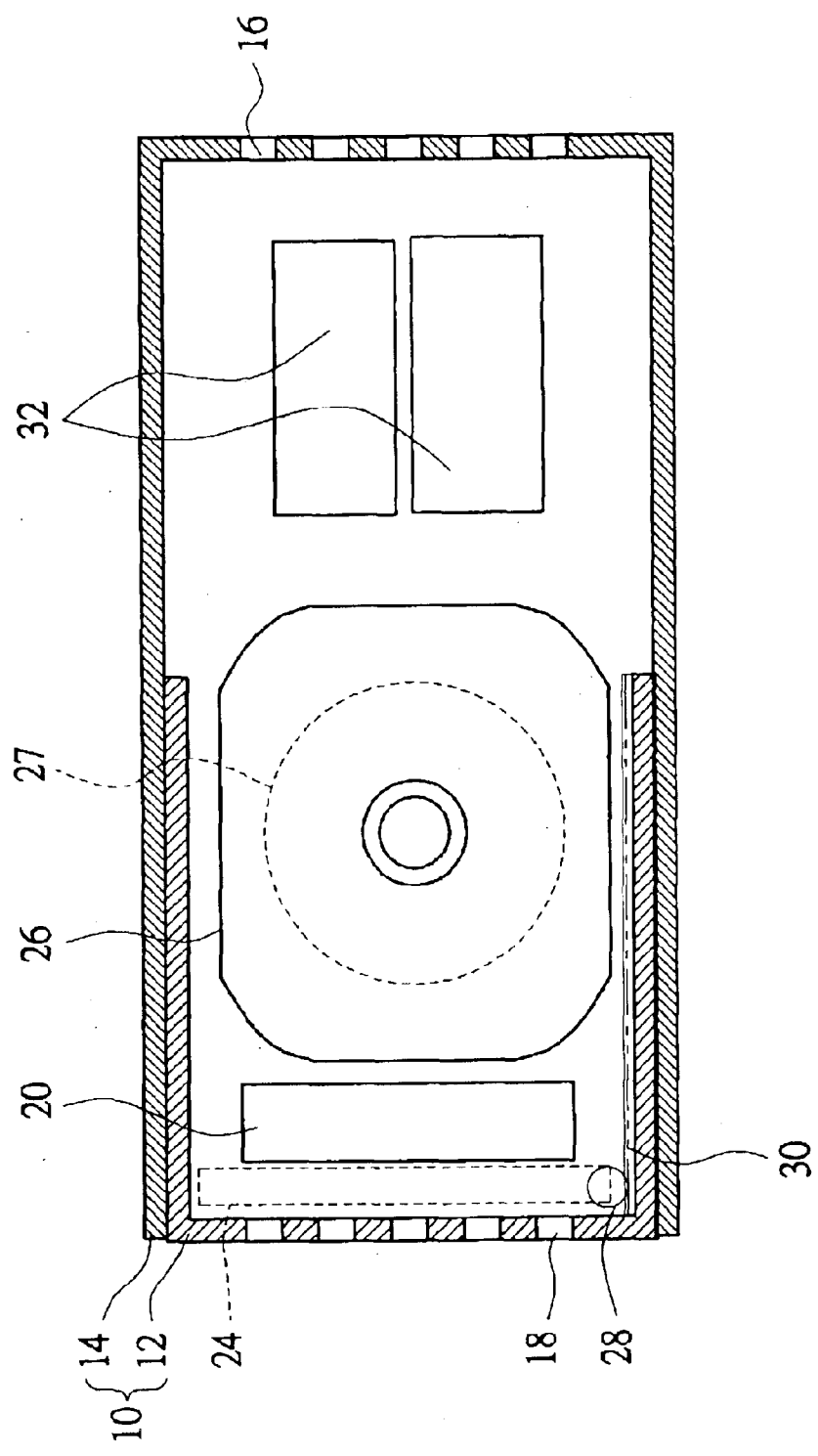
FIG. 5 is a schematic illustration showing a projector in a retracted state according to a second embodiment of the invention.
Figure 6:
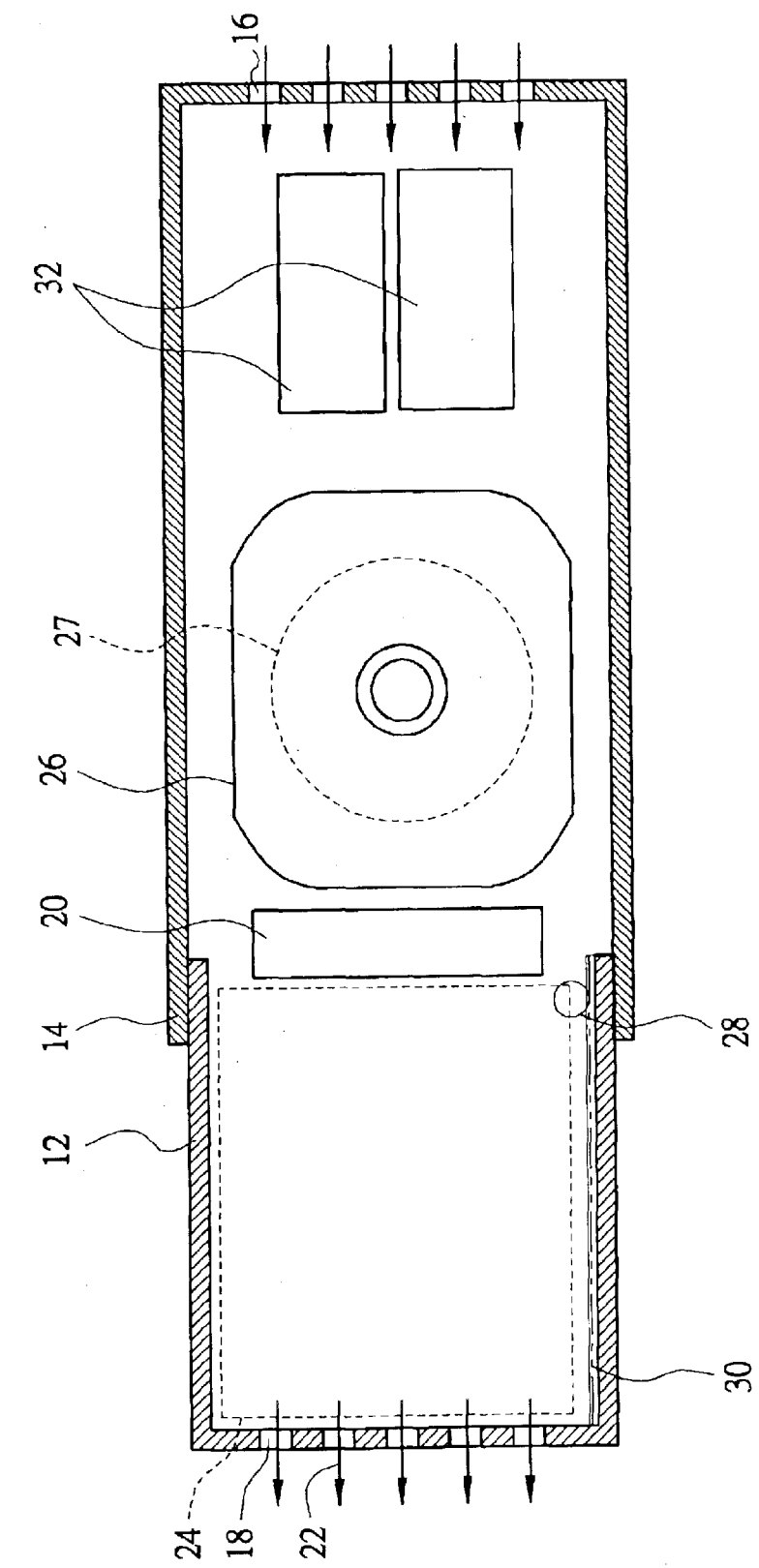
FIG. 6 is a schematic illustration showing the projector in an expanded state according to the second embodiment of the invention.

FIGS. 5 and 6 are schematic illustrations showing projectors in a retracted state and an expanded state according to a second embodiment of the invention, respectively. Referring to FIGS. 5 and 6, the projector according to the second embodiment of the invention includes a casing 10, inlet ports 16 and outlet ports 18 formed on the casing 10, a fan 20, a light source 26 and a plurality of circuit boards 32. The light source 26 is installed within the casing 10 and interposed between the inlet ports 16 and the fan 20. A plurality of electronic elements (not shown) for the projector is installed on the circuit boards 32. The fan 20 is installed in the casing 10 to suck air streams 22 from the inlet ports 16 and take away the heat generated from the light source 26. A buffer chamber 24 is defined among the fan 20, the outlet ports 18 and the casing 10. The air streams 22 pass through the buffer chamber 24 and are slowed down and then exhausted from the outlet ports 18. It is to be noted that the casing 10 includes a first housing 12 and a second housing 14, wherein the first housing 12 is retractable relative to the second housing 14. The first housing 12 is formed with the outlet ports 18 and the second housing 14 is formed with the inlet ports 16.

For the sake of illustration, the projector of the invention may further include a driving gear 28 and a rack 30 attached to the first housing 12. The driving gear 28 and the rack 30 may be regarded as a driving device for driving the first housing 12 or the second housing 14 to move relative to each other. The driving gear 28 may be driven by a motor (not shown) so that the first housing 12 is retractable relative to the second housing 14 through the rack 30. In this condition, a user may control the relative relationship between the first housing 12 and the second housing 14 by pressing a key or button. Alternatively, one of the first and second housings may be moved relative to the other by the user's hand.

It is to be noted that the above-mentioned driving device may include transmission elements such as a worm and a Worm gear or a belt and a pulley to achieve its function.

When the projector is not used, as shown in FIG. 5, most of first housing 12 are retracted into the second housing 14. At this time, the projector has a minimum volume. When the projector is used, as shown in FIG. 6, a portion of the first housing 12 is pulled out of the second housing 14 along a direction substantially parallel to the direction of the air streams 22. At this time, the volume of the buffer chamber 24 is enlarged so that the air streams 22 may be sufficiently slowed down in the buffer chamber 24 and then exhausted from the outlet ports 18. Thus, the noises may be advantageously reduced.

Figure 7:
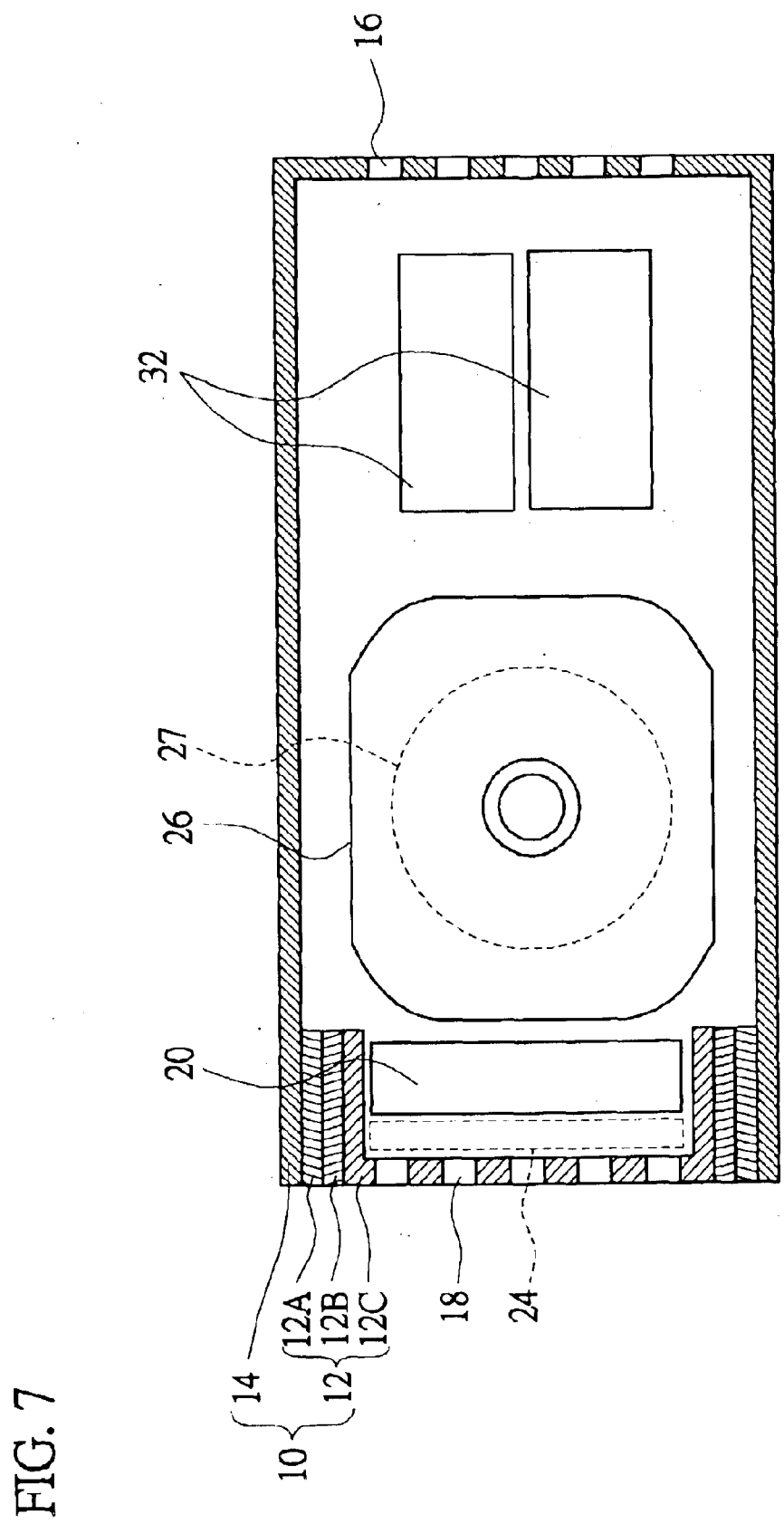
FIG. 7 is a schematic illustration showing a projector in a retracted state according to a third embodiment of the invention.
Figure 8:
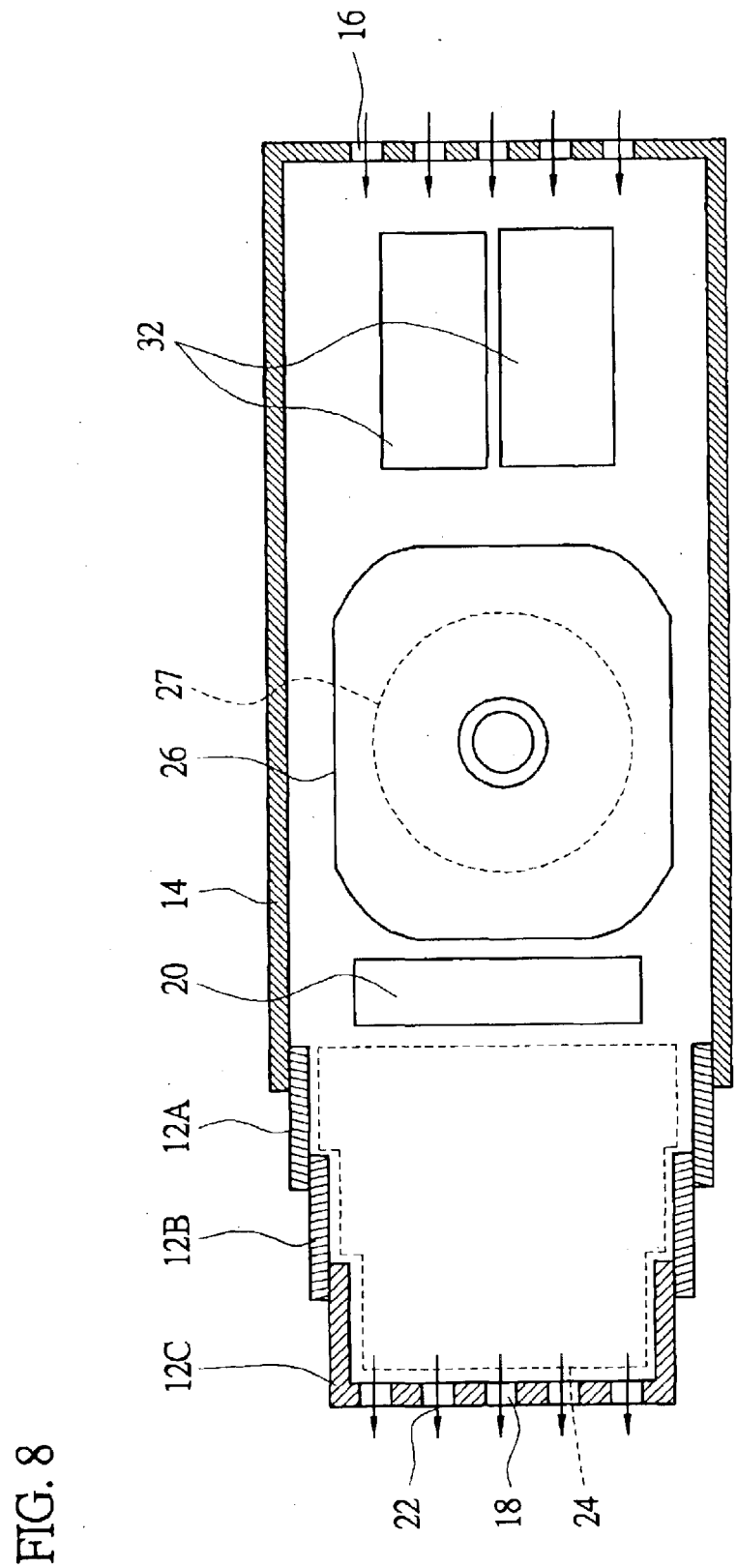
FIG. 8 is a schematic illustration showing the projector in an expanded state according to the third embodiment of the invention.

FIGS. 7 and 8 are schematic illustrations showing projectors in a retracted state and an expanded state according to a third embodiment of the invention, respectively. Referring to FIGS. 7 and 8, the projector according to the third embodiment of the invention has similar configurations to those of the second embodiment except for one difference. The difference resides in that the first housing 12 has three portions 12A, 12B and 12C. In this embodiment, the same effects as those of the second embodiment may also be achieved. In addition, the volume of the projector may be further reduced by designing the first housing 12 having multiple sections.

Figure 9:
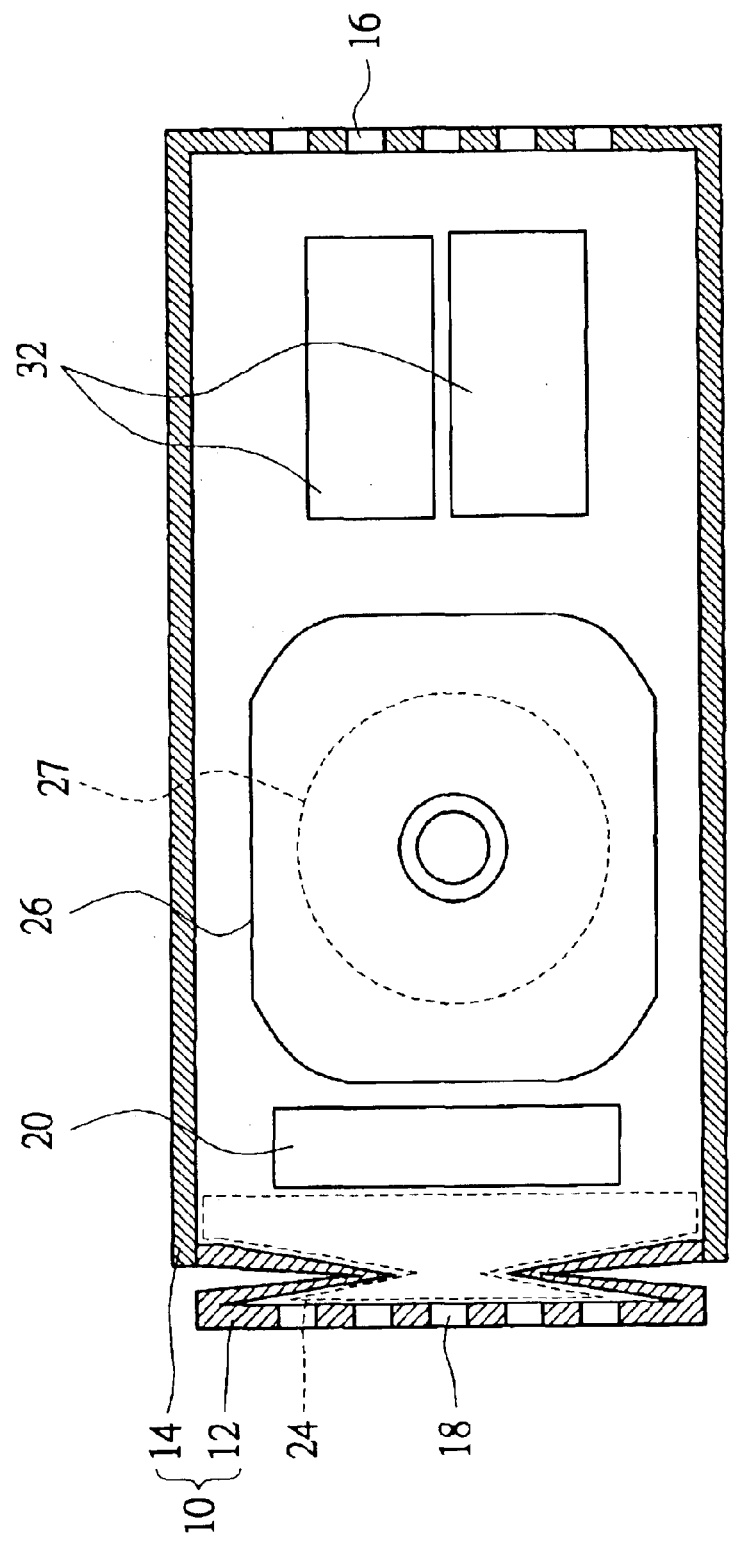
FIG. 9 is a schematic illustration showing a projector in a retracted state according to a fourth embodiment of the invention.
Figure 10:
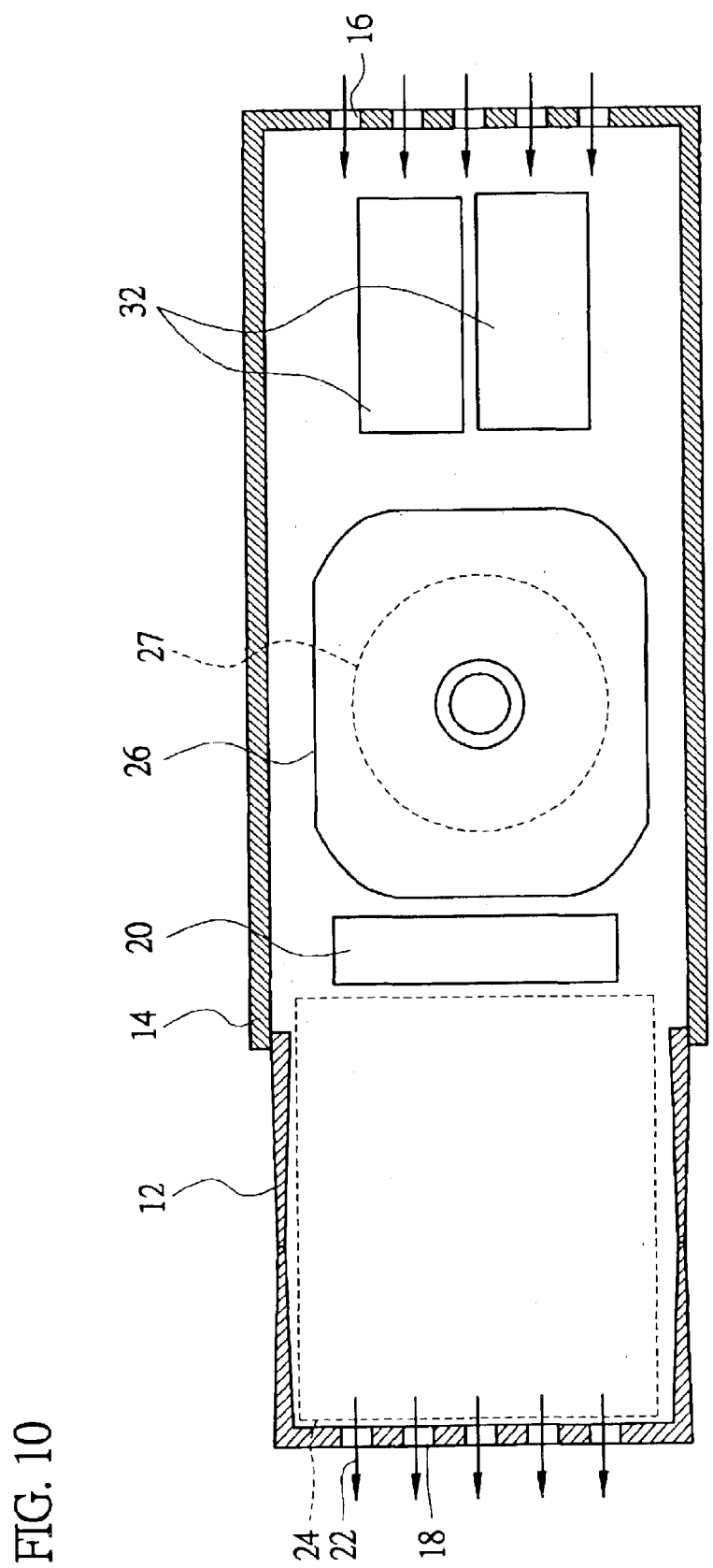
FIG. 10 is a schematic illustration showing the projector in an expanded state according to the fourth embodiment of the invention.

FIGS. 9 and 10 are schematic illustrations showing projectors in a retracted state and an expanded state according to a fourth embodiment of the invention, respectively. Referring to FIGS. 7 and 8, the projector according to the fourth embodiment of the invention has similar configurations to those of the second embodiment except for one difference. The difference resides in that the first housing 12 is made of a foldable and flexible material, and the user may push or pull the first housing 12 to change the volume of the buffer chamber 24. In this embodiment, the same effects as those of the second embodiment may also be achieved. Furthermore, no track interface between the first housing 12 and the second housing 14 as shown in the first to third embodiments has to be employed in the fourth embodiment.

According to the projector of the invention, it is possible to solve the heat dissipation problem, the noise problem and the volume problem of the conventional projector. Consequently, the projector of the invention may have reduced noises when it is used, and may have a small volume when it is not used.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A projector, comprising:

a casing;

a plurality of inlet ports formed on the casing;

a plurality of outlet ports formed on the casing;

a light source positioned within the casing;

an optical engine for processing light rays from the light source and projecting an image onto a display screen; and a fan installed within the casing to suck air streams into the casing from the inlet ports and to exhaust the air streams out of the casing from the outlet ports, wherein a buffer chamber is defined among the fan, the outlet ports, and the casing, and the casing comprises:

a first housing; and a second housing, wherein the first housing is retractable relative to the second housing so that a volume of the buffer chamber may be changed, and the inlet ports and the outlet ports are formed on each of the first housing and the second housing.

2. The projector according to claim 1, wherein the light source is mounted to the casing and positioned between the inlet ports and the fan.

3. The projector according to claim 1, further comprising a driving device for moving one of the first and second housings relative to the other.

4. The projector according to claim 3, wherein the driving device comprises:

a rack attached to the first housing; and a driving gear for driving the rack so as to move the first housing.

5. The projector according to claim 1, wherein the first housing is retractable relative to the second housing along a direction perpendicular to a direction of the air streams.

* * * * *